United States Patent Office 3,304,222
Patented Feb. 14, 1967

3,304,222
ADHESIVE COMPOSITION COMPRISING A RUBBER LATEX AND A MODIFIED RESORCINOL-ALDEHYDE CONDENSATE
Philip H. Wilken, Raleigh, N.C., assignor to Monsanto Company, St. Louis, Mo., a corporation of Delaware
No Drawing. Filed Nov. 12, 1964, Ser. No. 410,770
16 Claims. (Cl. 161—227)

This invention relates to novel compositions and their use as adhesives. More particularly, this invention relates to the use of these novel compositions in the bonding of synthetic filamentary material to rubber and other elastomers.

In many rubber and other elastomeric articles designed to withstand considerable stresses in use, the rubber is reinforced with synthetic materials. Rubber hose, belts, tires, and the like are commonly reinforced with textile material in the form of fibers, including staple, yarns, cords, and the like, or woven or braided fabric. In such articles, it is important that the textile reinforcement forcing material be firmly adhered to the rubber and remain firmly adhered thereto even after the article has been subjected to repeated varying strains in use, because any separation and relative movement of the rubber and textile parts leads to abrasion between these parts and consequent early failure of the article.

Some of the most desirable filamentary materials for reinforcing rubber and the like are the filaments of synthetic fiber-forming organic materials such as nylon, rayon, polyesters, and the like. Such filamentary materials have excellent strength and flex resistance but are poorly adherent to rubber. These filamentary materials are commonly bonded to the rubber or other elastomeric compositions by means of adhesive compositions. Therefore, there is special need for improved adhesives in the bonding of synthetic fibers such as nylon and polyester fibers to rubber and the like in order to effect strong and durable bonding between the fibers and rubber, both at normal and at elevated temperatures.

It is an object of this invention to provide improved adhesive compositions for the bonding of reinforcement synthetic filamentary material to rubber or other elastomeric substrates.

It is another object of this invention to provide adhesive compositions which have outstanding adhesive properties at both normal and elevated temperatures.

It is another object of this invention to provide adhesive systems which have much longer useful shelf-life than those of adhesive systems previously known.

Other objects and advantages of this invention will be apparent from the description thereof which follows.

The objects of this invention have been accomplished by providing an adhesive composition of the phenol-aldehyde-latex type in which there is substituted for all or part of the phenol and equivalent amount of a modified resorcinol of the formula

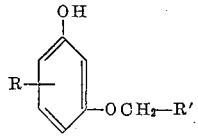

in which R is a hydrogen or a lower alkyl group of about 1–6 carbon atoms, and R' is a hydrocarbon group of about 2–9 carbons which contains at least 1 ethylenically unsaturated bond. Preferably, R will be hydrogen and R' will be a hydrocarbon group of about 3 to 6 carbons which contains at least 1 ethylenically unsaturated bond.

The adhesives that are used in the treatment of the reinforcing materials in accordance with this invention are those comprising an aqueous solution of a resin-forming material selected from specific well-known materials such as the heat-hardenable phenol-aldehyde resins and especially those phenol-aldehyde resins in which the aldehyde is formaldehyde and the phenol is resorcinol. These phenol-aldehyde resins are generally described in U.S. patent 2,128,229 and consist of substantially equimolar quantities of an aldehyde and a phenol. The phenol-aldehyde resin is used in combination with a synthetic or natural rubber latex. Preferably, the rubber latex will consist of polyvinyl pyridine or copolymers or terpolymers of vinyl pyridine with styrene and/or butadiene. The latex to resin ratio in the adhesive compound will range from about 6:1 to 2:1 parts by weight.

In the adhesives of this invention the well-known phenol-aldehyde resins disclosed in the prior art are modified by the use of a phenol-aldehyde resin in which there is substituted for part or all of the phenol an equivalent amount of a modified resorcinol of the formula

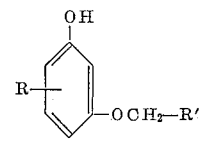

in which R is a hydrogen or a lower alkyl group of from 1 to 6 carbon atoms and R' is a hydrocarbon group of from 2 to 9 carbon atoms which contains at least 1 ethylenically unsaturated bond. Illustrative of specific modified resorcinols that may be used to prepare the adhesives of this invention are 2-vinylallyl 3-hydroxyphenyl ether, m-hydroxyphenol allyl ether, and the like. The phenol portion of the phenol-aldehyde resin should consist of from about 5 to 100 percent of the modified resorcinol of this invention. The remainder of the phenol portion is made up of well-known phenol substituents as shown in the prior art. Preferably, the phenol portion of the phenol-aldehyde resin will consist of from about 25 to 50 percent by weight of the modified resorcinols of this invention.

The improved adhesive compositions of this invention are prepared in the conventional manner for the preparation of phenol-aldehyde-latex adhesive compositions and such procedures are well known in the art. The improved adhesive compositions of this invention require no special handling beyond the proportions normally taken with ordinary phenol-aldehyde-latex adhesive compositions.

Generally, the adhesive composition may be prepared by adding the phenol to water and then adding the aldehyde to the mixture to produce about a 10 percent by weight phenol-aldehyde solution. The aldehyde is preferred to be used in a molar excess ranging from about 1.01 to 2.0 moles per mole of phenol and preferably from about 1.5 to 1.7 moles of formaldehyde per mole of resorcinol and modified resorcinol. The use of an excess of the aldehyde portion allows for an evaporation of the aldehyde during the preparation of the adhesive composition to produce a final product containing substantially equimolar quantities of aldehyde and phenol. A synthetic rubber latex containing from about 20 to 40 percent by weight solids is added to the phenol-aldehyde solution. An ammonia and/or sodium hydroxide solution may be added to provide stability as well as to aid in obtaining the desired cured adhesion properties. The phenol-aldehyde-latex dip will usually end up with a solids content generally ranging from about 10 to 25 percent by weight comprising from about 70 to 85 percent by weight of the rubber latex and from about 15 to 30 percent by weight of the aldehyde-phenol resin which consists of substantially equimolar quantities of aldehyde and phenol. Preferably the phenol-aldehyde-latex dip will have a solids content generally ranging from about 18 to 22 percent by weight of which about 85 percent is the rubber latex and about 15 percent is the aldehyde-phenol resin.

The organic fiber may be run through the dip under a reasonably low temperature and at a rate which will permit the fiber to become thoroughly wet. Generally, the solids pick up on the fiber will range from about 3 to 7 percent. The fiber is then dried for several minutes at temperatures at about 250 to 325° F. The fiber is then embedded in the vulcanizable polymeric organic rubber material followed by the vulcanizing of the rubber material.

The filamentary material employed in the practice of this invention may be any of those synthetic filaments comprising a synthetic fiber-forming organic material. Therefore, the synthetic filaments may include rayon; polyamides, such as polyhexamethylene adipamide; polyesters such as polyethylene terephthalate; and similar fiber-forming organic materials. The invention is particularly applicable where the filamentary material comprises a polyamide such as polyhexamethylene adipamide (nylon) or a polyester such as polyethylene terephthalate. The polyesters are filaments which normally exhibit very poor adherent properties.

The rubber material to which the filamentary reinforcing material is adhered may be any sulfur vulcanizable polymeric organic rubber material, either crude or synthetic, and preferably crude rubber or the rubbery butadiene copolymers. The crude rubber employed may be any of the naturally occurring rubber materials including caoutchouc, balata, gutta, percha and the like. In addition, any of the various synthetic rubber may be used including polymers of butadiene-1,3; isoprene; 2-chlorobutadiene-1,3; isobutylene; and the like, and interpolymers of these and similar materials with each other or with such interpolymerizable monomers as styrene, acrylonitrile, methacrylonitrile, acrylate, methyl acrylate, ethylmethylacrylate, 2-vinylpyridine, and like monomeric materials. The rubber materials may also include mixtures of any of the above materials with each other or with reclaimed crude or synthetic rubber or other sulfur vulcanizable rubber materials. The rubber materials may also include any of the well-known compounding ingredients for rubber in proportions in accordance with conventional compounding techniques. These compounding ingredients include such materials as vulcanizing agents and accelerators, antioxidents, fillers, reinforcing agents, emulsifiers, stabilizers, modifiers, coloring agents, and the like.

To further illustrate the present invention and the advantages thereof, the following specific examples are given, it being understood that these are merely intended to be illustrative and not limitative. Unless otherwise indicated, all parts and percentages are by weight.

*Example 1*

This example outlines the procedure used in making a conventional adhesive dip formulation. A mixture of 0.3 parts of sodium hydroxide, 16.2 parts of 37 percent aqueous formaldehyde, 11 parts of resorcinol and 238.5 parts of water were thoroughly mixed and allowed to stand for 6 hours. 250 ml. of a polyvinylpyridine-styrene-butadiene latex, sold by General Tire and Rubber Company under the trade name of "Gen-Tac," was diluted with 60 parts of water and the first mixture added with gentle agitation to this latex. The mixture had a pot life of 72 hours and was ready for immediate use. This mixture was used as the control for latex examples which follow. The modified dips of this invention were made in identical fashion except that various proportions of the resorcinol were substituted for by the addition of equimolar quantities of the various modified resorcinols.

*Example 2*

This example outlines the preparation of a typical modified resorcinol useful in the practice of this invention. Into a 500 ml., 3-neck, round bottom flask equipped with a condenser and a Dean-Stark water trap was placed 10.3 grams of sodium hydroxide and 20 ml. of water. The mixture was stirred until the sodium hydroxide had dissolved. 125 ml. of benzene was added to the mixture. 27.5 grams of resorcinol was then added to the mixture followed by an additional 125 ml. of benzene. The mixture was heated and stirred until 24 ml. of water had been collected. The heating was continued and 200 ml. of benzene distilled off. The reaction mixture was cooled to room temperature and 150 ml. of dimethyl formamide and a solution of 26 grams of 2-chloromethylbutadiene-1,3 in 50 ml. of dimethylformamide was added slowly, a mildly exothermic reaction taking place. This mixture was allowed to stand 64 hours at room temperature, and then poured into 600 ml. of water with stirring. The mixture was then made strongly acidic with 25 ml. of concentrated hydrochloric acid and the oily layer which separated during this addition was isolated. This oily layer was crude 2-vinylallyl 3-hydroxyphenyl ether and weighed 24.8 grams representing a yield of 56 percent of the theoretical. This material can be used directly in the preparation of adhesive dip formulations.

*Example 3*

This example describes the standard procedure used in testing the cord-rubber adhesives of various coated cords via what is commonly known in the art as the H-block test. In this and later examples the cords contain approximately 8 to 10 percent dip solids based on the weight of dry cord.

Conventional H-block test specimens were prepared using a steel mold. A strip of raw rubber was positioned in the mold, a dipped cord to be imbedded was carefully positioned and a second strip of rubber overlaid. The top of the mold was positioned and the mold transferred to a curing press, the press being adjusted to give 250 p.s.i.g. pressure at a mold temperature of about 300° F. Curing times were 45 minutes for rubber stock one and 30 minutes for rubber stock two. Both rubber stocks were conventional passenger tire compositions blended from natural and styrene-butadiene rubbers. Stock number one contain a substantial portion of reclaimed rubber. The cured specimens were removed from the mold and excess rubber trimmed off to yield specimens which consisted of two 1" by 5/16" by 3/16" thick strips joined centrally by a small 3/8" rubber strip which forms the cross-bar between the legs of the H-shaped sample. The cord passes centrally through the 5/16" short dimension of each leg and through the crossbar.

Samples were tested by pulling them apart in an Instron tensile tester at temperatures of 25° C. and 120° C. with a crosshead speed of 10 inches per minute. The force required to pull the cord from the test samples was reported to the nearest 0.1 pound.

In all the H-block tests the blocks were prepared from rubber one unless otherwise indicated. A comparison of relative adhesions of nylon cord to both stock one and stock two is shown in Table 1 for illustrative purposes since adhesions will vary depending on the stock used. The values in Table 1 were derived by testing samples prepared using the standard dip of Example 1. Each value is an average of 20 determinations.

TABLE 1

| Rubber Stocks | H-Block Adhesion, pounds | |
|---|---|---|
| | Room Temperature | 120° C. |
| 1 | 19.8 | 10.0 |
| 1 | 19.0 | 9.0 |
| 2 | 14.8 | 8.3 |
| 2 | 14.8 | 8.9 |

*Example 4*

Three dip formulations were prepared. The first was a control or standard dip and was prepared according to the procedure of Example 1. The second was prepared according to the procedure of Example 1 except that 25 percent of the resorcinol was omitted and was replaced by an equimolar quantity of the modified resorcinol of Example 2. The third dip was prepared according to procedure of Example 1 except that 50 percent of the resorcinol was omitted and was replaced by an equimolar quantity of the modified resorcinol of Example 2.

Nylon cords were coated with the adhesive dips and H-block test samples were prepared according to procedure of Example 3. The test samples were evaluated for adhesion at room temperature in an Instron tester using a crosshead travel of 10 inches per minute. Adhesive strengths are shown in Table 2. The reported values are averages of 20 samples for each dip formulation.

TABLE 2

Dip number:            H-block adhesion, pounds
1 (control) _____ 18.4
2 _____ 24.4
3 _____ 23.3

Inspection of the test cords after testing showed a thin, continuous coating of rubber adhering to the cord, and no cord was visible. Cords from H-blocks prepared using the control dip showed spotty, discontinuous rubber coatings with the cord clearly visible after testing. These cord comparisons clearly showed superior bond strength and uniformity of the adhesive-to-rubber bond with the test formulations as compared to the control.

*Example 5*

Since it is important that cord to rubber bonding strengths should remain high at the elevated temperatures to which reinforced elastomer substrates, such as tires, may be exposed under severe conditions, a number of H-block test samples were prepared from nylon cords, again using the dips of Example 4. The samples were then subjected to Instron testing at a temperature of 120° C. The test results are tabulated in Table 3 and are the averages of 20 determinations for each dip formulation.

TABLE 3

Dip number:     120° C. H-block adhesion, pounds
1 (control) _____ 11.8
2 _____ 15.3
3 _____ 13.0

Visual inspection of the test cords showed the same differences cited in Example 40 above, the test cords showing an essentially continuous coating of rubber upon separation from the H-block test samples.

*Example 6*

The test formulations of Examples 4 and 5 were used to coat polyethylene terephthalate cords and H-block test samples were prepared according to the procedure of Example 3. Adhesion tests were then carried out at room temperature and at 120° C.

As a control, polyethylene terephthalate cords were treated in a two-dip treatment such as is normally used to achieve satisfactory adhesion to rubber. The cords were passed through a formulation containing 5.1 parts of Eponite 100 (an epoxy resin sold by Shell Chemical Company), 0.3 part of Petrowet R (a wetting agent sold by Du Pont), 28.4 parts of Gen-Tac vinyl pyridine latex and 65.7 parts of water. The cords were immersed in the adhesive formulation and removed, excess dip drained, and then baked for 60 seconds at 425° F. while being stretched 5 percent. The dried cords were redipped with no stretch in a second formulation containing 2.6 parts of m-phenylene diamine, 28.7 parts of Gen-Tac, 19 parts of Pliolite 2104 (a rubber latex sold by Goodyear Tire and Rubber Co.) and 49.7 parts of water followed by baking for 60 seconds at 425° F. The dipped cords were then used to prepare H-block test samples according to the procedures of Example 3. The results of the H-block tests are given in Table 4.

TABLE 4

| Dip Number | H-Block Adhesion, pounds | |
|---|---|---|
| | Room Temperature | 120° C. |
| 1 (Control) | 16.1 | 5.6 |
| 2 | 13.7 | 9.0 |
| 3 | 15.3 | 7.5 |

It can be seen from these test results that the single dip system of this invention was essentially equivalent to the troublesome double dip system of the prior art at room temperature and is superior at higher temperatures.

One of the additional disadvantages of conventional adhesive dip systems currently known and used is their relatively brief "pot life" due to deterioration upon standing. Thus the control dip of Example 1 is found to provide satisfactory adhesion provided it is used within about 72 hours of its preparation. I have found that the new adhesive formulations of this invention have a much superior resistance to aging. Table 5 demonstrates the superior aging resistance of a dip prepared substituting the modified resorcinol of Example 2 for 25 percent of the normal resorcinol in the standard dip. Each value cited represents the average of at least 9 determinations.

TABLE 5

| Dip Age | H-Block Adhesion, pounds | | | |
|---|---|---|---|---|
| | Nylon | | Polyester | |
| | Room Temperature | 120° C. | Room Temperature | 120° C. |
| Days: | | | | |
| 0 | 24.9 | 15.2 | 13.7 | 8.9 |
| 11 | 25.9 | 13.5 | 15.2 | 8.3 |
| 26 | 26.4 | 11.9 | 17.5 | 7.6 |

*Example 7*

A series of dip formulations were prepared in which the only difference was the quantity of modified resorcinol used. In each case where the modified material was substituted an equivalent molar quantity of resorcinol was omitted. H-block samples were prepared as previously described using nylon cord and Instron measurements of adhesion made at room temperature. Table 6 shows the results obtained. The modified resorcinol used was that prepared in Example 2. The percent substitution column indicates the portion of modified resorcinol substituted for resorcinol in the particular formulation.

TABLE 6

Percent substitution:      Room temperature H-block adhesion, pounds
0 _____ 20.0
10 _____ 24.1
25 _____ 24.9
50 _____ 23.7
95 _____ 24.6
100 _____ 25.7

*Example 8*

Resorcinol was modified by reaction with an allky halide in a procedure similar to that described in Example 2. The resulting m-hydroxy-phenyl allyl ether was used in place of 25 percent by weight of the resorcinol to prepare an adhesive dip formulation following the procedure of Example 1. Table 7 describes the results obtained in adhesion tests with rubber stock two and nylon cord using this modified adhesive composition. The control values were obtained using the standard resorcinol dip of Example 1.

TABLE 7

| Dip Number | H-Block Adhesion, pounds | |
|---|---|---|
| | Room Temperature | 220° C. |
| 1 (Control) | 11.8 | 6.1 |
| 2 | 13.3 | 7.5 |

*Example 9*

As another test of the superiority of the adhesive formulations of this invention, evaluations were carried out on the effect of fatigue on the retention of the strength of the cord-rubber bond. Single adhesive-dipped cords (840/140 nylon tire cord) were vulcanized into rubber flocks (2" x ½" x ½") with the cord positioned centrally along the long axis. A cord pretension of 50 grams was used during the pressure-temperature-time vulcanization cycle which was carried out at 500 p.s.i. with the temperature rising rapidly from 70° F. to 285° F. The latter temperature was maintained for one hour to cure the samples. The samples, after curing, were cooled and stored at 70° F. and 65 percent relative humidity until tested.

Test samples were then fatigued using a Goodrich Disc Compression Fatigue Tester in which the test blocks were submitted to alternating cycles of 3 percent tension and 15 percent extension at a rate of 1960 cycles per minute. After the desired time the test blocks were removed and the force required to pull the cord from the rubber block was measured and compared to that required to pull the cord from an unfatigued control block.

As a control, test blocks were prepared using the control dips of Example 1. Blocks were also made using the second dip of Example 4 (25 percent of the resorcinol replaced by an equimolar quantity of 2-vinylallyl 3-hydroxyphenyl ether. Control and test blocks were then fatigued as described above. Control blocks with standard adhesive dip showed a 20 percent retention of pullout force compared to the original, unfatigued blocks after 120 hours of fatiguing. Blocks prepared using the modified adhesive dip of this invention retained 60 percent of their original pullout force after 168 hours of fatiguing, thus demonstrating their superior resistance of fatiguing in terms of the retention of original adhesion strength.

As many widely different embodiments of this invention may be made without departing from the spirit and scope thereof, it is to be understood that the invention is not limited to the specific embodiment thereof, except as defined in the appended claims.

I claim:

1. A water-based adhesive composition having a solids content of from about 10 to 25 percent by weight comprising a rubber latex, an aldehyde, and a phenol selected from the group consisting of (1) compounds of the formula

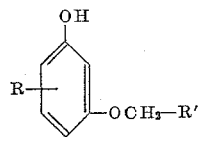

in which R is a member selected from the group consisting of hydrogen and lower alkyl groups of from about 1 to 6 carbon atoms and R' is a hydrocarbon radical of from about 2 to 9 carbon atoms which contains at least 1 ethylenically unsaturated bond and (2) mixtures of said components and another phenol.

2. A water-based adhesive composition having a solids content of from about 10 to 25 percent by weight comprising about 70 to 85 percent by weight of a rubber latex and from about 15 to 30 percent by weight of an aldehyde-phenol resin comprising substantialy equimolar quantities of an aldehyde and a phenol, said phenol comprising 5 to 100 perecnt by weight of a compound of the formula

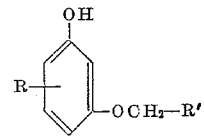

in which R is a member selected from the group consisting of hydrogen and lower alkyl groups of from about 1 to 6 carbon atoms and R' is a hydrocarbon radical of from about 2 to 9 carbon atoms which contains at least 1 ethylenically unsaturated bond, the remainder being another phenol.

3. A water-based adhesive composition having a solids, content of from about 18 to 22 percent by weight, said solids content comprising about 85 percent by weight of a rubber latex and about 15 percent by weight of an aldehyde-phenol resin comprising substantialy equimolar quantities of an aldehyde and a phenol, said phenol comprising from about 25 to 50 percent by weight of a compound of the formula

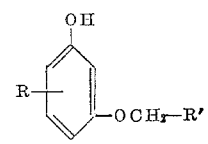

in which R is a hydrogen and R' is a hydrocarbon radical of from about 3 to 6 carbon atoms which contains at least 1 ethylenically unsaturated bond, the remainder being another phenol.

4. A water-based adhesive composition having a solids contents of from about 18 to 22 percent by weight, said solids content comprising about 85 percent by weight of a latex selected from the group consisting of polyvinyl pyridine and copolymers and terpolymers of polyvinyl pyridine with styrene and butadiene and about 15 percent by weight of a formaldehyde-phenol resin comprising substantially equimolar quantities of formaldehyde and a phenol, said phenol comprising from about 25 to 50 percent by weight of a compound of the formula

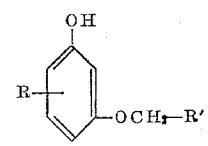

in which R is a hydrogen and R' is a hydrocarbon radical of from about 3 to 6 carbon atoms which contains at least 1 ethylenically unsaturated bond, the remainder being resorcinol.

5. A composition as defined in claim 4 wherein the phenol used comprises from about 25 to 50 percent by weight of 2-vinylallyl 3-hydroxy-phenyl ether, the remainder being resorcinol.

6. A composition of matter as defined in claim 4 wherein the phenol used comprises from about 25 to 50 percent by weight of m-hydroxyphenyl allyl ether, the remainder being resorcinol.

7. The method of adhering a synthetic organic fiber to a body of sulfur vulcanizable polymeric organic rubber material which comprises treating said fiber with a water-based adhesive composition having a solids content of from about 10 to 25 percent by weight, said solids content comprising from about 70 to 85 percent by weight of a rubber latex and from about 15 to 30 percent by weight of an aldehyde-phenol resin comprising substantially equimolar quantities of an aldehyde and a phenol, said phenol comprising from about 5 to 100 percent by weight of a compound of the formula

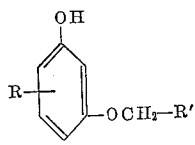

in which R is a member selected from the group consisting of hydrogen and lower alkyl groups of from about 1 to 6 carbon atoms and R' is a hydrocarbon radical of from about 2 to 9 carbon atoms which contains at least 1 ethylenically unsaturated bond, the remainder being another phenol, drying said treated fiber and assembling said fiber in intimate relation with said body of vulcanizaable polymeric organic rubber material, and vulcanizing said vulcanizable polymeric organic rubber material.

8. The method of adhering a synthetic organic fiber to a body of sulfur vulcanizable polymeric organic rubber material which comprises treating said fiber with a water-based adhesive composition having a solids content of from about 18 to 22 percent by weight, said solids content comprising about 85 percent by weight of a rubber latex and about 15 percent by weight of an aldehyde-phenol resin comprising substantially equimolar quantities of an aldehyde and a phenol, said phenol comprising from about 25 to 50 percent by weight of a compound of the formula

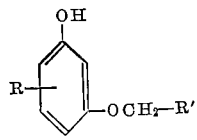

in which R is a hydrogen and R' is a hydrocarbon radical of from about 3 to 6 carbon atoms which contains at least 1 ethylenically unsaturated bond, the remainder being another phenol, drying said treated fiber and assembling said fiber in intimate relation with said body of vulcanizable polymeric organic rubber material, and vulcanizing said vulcanizable polymeric organic rubber material.

9. The method of adhering a synthetic organic fiber to a body of vulcanizable polymeric organic rubber material which comprises treating said fiber with a water-based adhesive composition having a solids content of from about 18 to 22 percent by weight, said solids content comprising about 85 percent by weight of a latex selected from the group consisting of polyvinyl pyridine and copolymers and terpolymers of polyvinyl pyridine with styrene and butadiene and about 15 percent by weight of a formaldehyde-phenol resin comprising substantially equimolar quantities of formaldehyde and said resin, said resin comprising from about 25 to 50 percent by weight of a compound of the formula

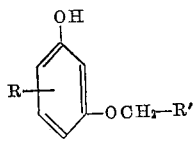

in which R is a hydrogen and R' is a hydrocarbon radical of from about 3 to 6 carbon atoms which contains at least 1 ethylenically unsaturated bond, the remainder being resorcinol, drying said treated and assembling said fiber in intimate relation with said body of vulcanizable polymeric organic rubber material, and vulcanizing said vulcanizable polymeric organic rubber material.

10. The method as defined in claim 9 in which the synthetic organic fiber used is nylon.

11. The method as defined in claim 9 in which the synthetic organic fiber used is polyethylene terephthalate.

12. An article comprising a body of vulcanized polymeric organic rubber material bonded to a synthetic organic fiber by an adhesive composition comprising from about 70 to 85 prcent by weight of a rubber latex and from about 15 to 30 percent by weight of an aldehyde-phenol resin comprising substantially equimolar quantities of said aldehyde and said phenol, said phenol comprising from about 5 to 100 percent by weight of a compound of the formula

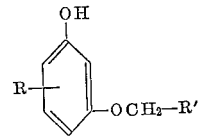

in which R is a member selected from the group consisting of hydrogen and lower alkyl groups of from about 1 to 6 carbon atoms and R' is a hydrocarbon radical of from about 2 to 9 carbon atoms which contains at least 1 ethylenically unsaturated bond, the remainder being another phenol.

13. An article comprising a body of vulcanized polymeric organic rubber material bonded to a synthetic organic fiber by an adhesive composition comprising about 85 percent by weight of a rubber latex and about 15 percent by weight of an aldehyde-phenol resin comprising substantially equimolar quantities of said aldehyde and said phenol, said phenol comprising from about 25 to 50 percent by weight of a compound of the formula

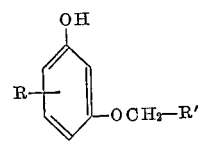

in which R is a hydrogen and R' is a hydrocarbon radical of from about 3 to 6 carbon atoms which contains at least 1 ethylenically unsaturated bond, the remainder being another phenol.

14. An article comprising a body of vulcanized polymeric organic rubber material bonded to an organic fiber by an adhesive composition comprising about 85 percent by weight of a latex selected from the group consisting of polyvinyl pyridine and copolymers and terpolymers of vinyl pyridine with styrene and butadiene and about 15 percent by weight of a formaldehyde-phenol resin comprising substantially equimolar quantities of said formaldehyde and said phenol, said phenol comprising from about 25 to 50 percent by weight of a compound of the formula

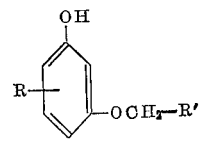

in which R is a hydrogen and R' is a hydrocarbon radical of from about 3 to 6 carbon atoms which contains at least 1 ethylenically unsaturated bond, the remainder being resorcinol.

15. An article as defined in claim 14 in which the organic fiber is nylon.

16. An article as defined in claim 14 in which the organic fiber is polyethylene terephthalate.

References Cited by the Examiner

FOREIGN PATENTS 676,703   6/1952   Great Britain.

OTHER REFERENCES

Chemical and Engineering News: "G.E.'s R–108 Is a Versatile Material," vol. 30, No. 47, p. 4986, Nov. 24, 1952.

MURRAY TILLMAN, *Primary Examiner.*

J. C. BLEUTGE, *Assistant Examiner.*